United States Patent [19]

Christensen

[11] 4,280,246

[45] Jul. 28, 1981

[54] SELF-STEERING CASTER

[75] Inventor: Carl O. Christensen, Alamo, Calif.

[73] Assignee: Roll-Rite Corp., Oakland, Calif.

[21] Appl. No.: 110,895

[22] Filed: Jan. 10, 1980

[51] Int. Cl.$^3$ .............................................. B60B 33/00
[52] U.S. Cl. .................................................... 16/35 D
[58] Field of Search ............ 16/35 D, 35 R; 188/1 D

[56] References Cited

U.S. PATENT DOCUMENTS

| 3,828,392 | 8/1974 | Bolger | 16/35R |
|---|---|---|---|
| 3,924,292 | 12/1975 | Christensen | 16/35 R |

*Primary Examiner*—Doris L. Troutman

*Attorney, Agent, or Firm*—Phillips, Moore, Weissenberger, Lempio & Majestic

[57] ABSTRACT

A self-steering caster is biased into one or more predetermined steering positions with a constant force by a bias wheel arranged to roll along a cam surface in the shape of a circle which is concentric with the caster's swivel axis and whose radius increases at a linear rate in both directions from the point corresponding to the steering position to a point or points on the cam surface remote from the steering position. Detent means may be provided at the steering position to releasably lock the caster in the steering position.

8 Claims, 7 Drawing Figures

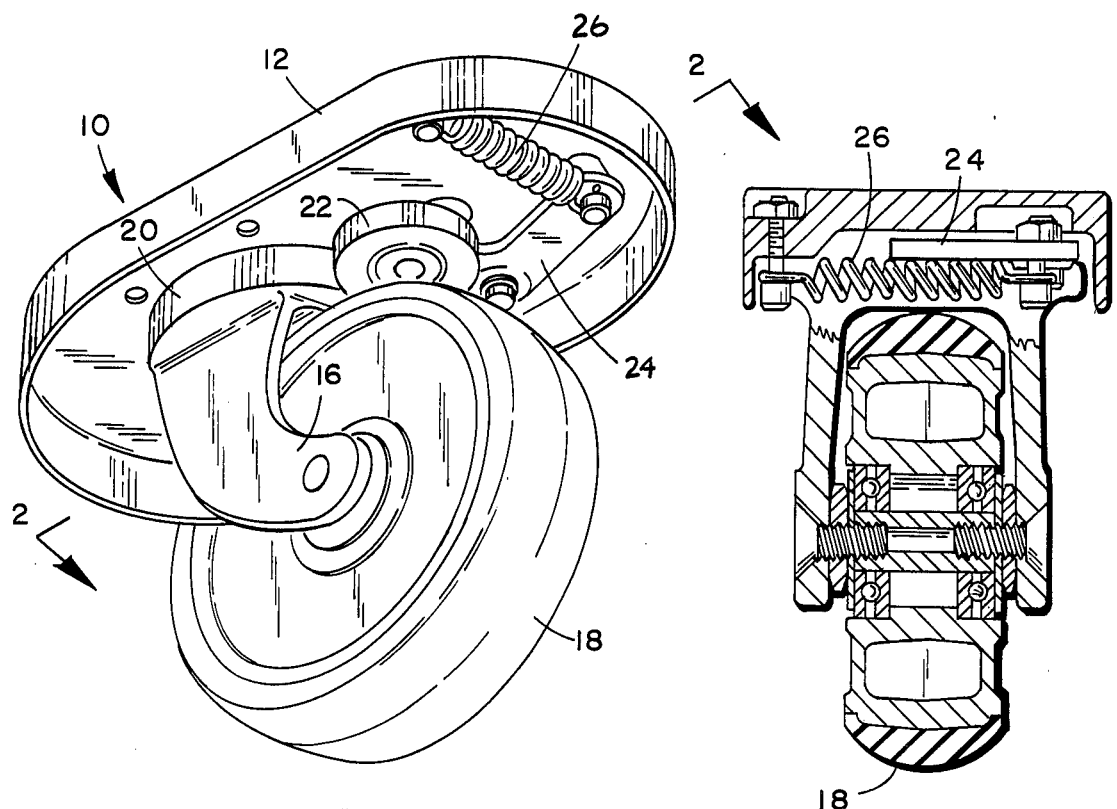
FIG. 1
FIG. 3
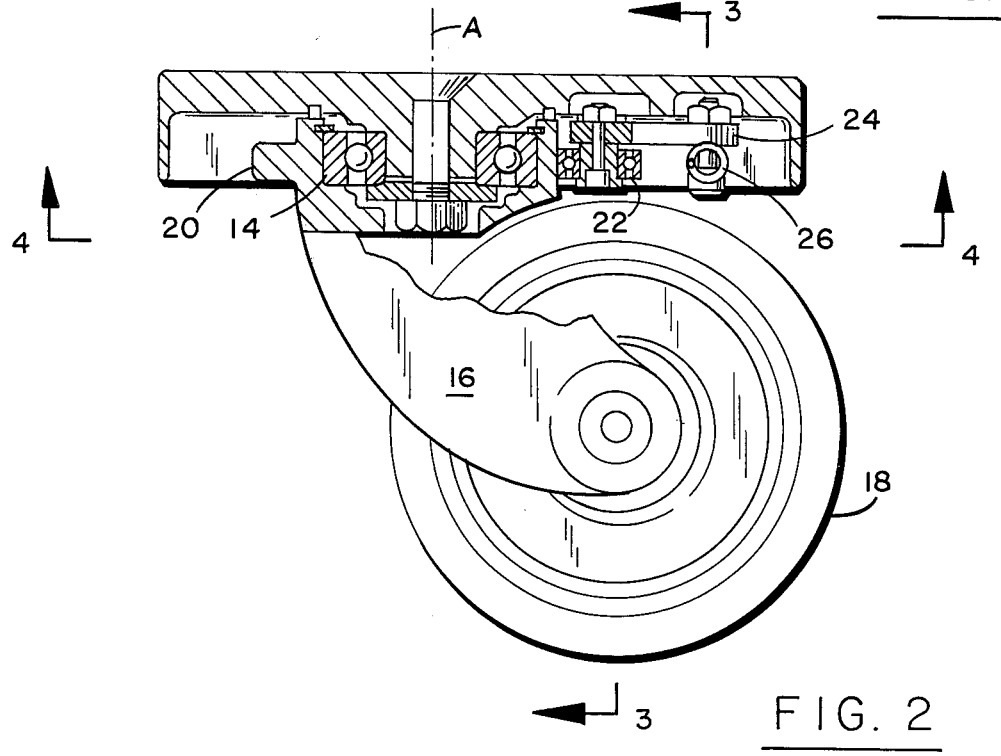
FIG. 2

SELF-STEERING CASTER

BACKGROUND OF THE INVENTION

U.S. Pat. No. 3,924,292 discloses an anti-flutter caster which is biased into a straight-line position when it deviates slightly from that position, but whose direction is not affected when it is turned substantially away from the straight-line position. This type of caster is useful in applications when the caster must be free to stay in a generally transverse position, but must be prevented from fluttering when in the straight-line position.

Recently, systems have been developed for semi-automatic materials handling in which it is necessary for a cart to be movable in a longitudinal or transverse direction, or at an angle, but to return the casters to a precise predetermined position when its handling is being taken over by mechanical devices. A typical example of such a system is a system developed for hospital use in which carts of food or medication are manually taken along the corridors, but are returned to central locations for resupplying and sterilization by an automatic conveyor system. The cart is loaded onto the conveyor system by a device which lifts the cart off the ground and deposits it in an elevator which then conveys it to a conveyor entrance station. It is essential for the functioning of this type of system that the cart, when in the automatic portion of the system, roll in an exactly straight longitudinal direction. Inasmuch as the casters, after handling by floor personnel, are not likely to be in a precisely aligned position, it is necessary to provide a caster which, as soon as the cart is lifted off the ground, will immediately return to a precise predetermined longitudinal position and lock itself in that position.

SUMMARY OF THE INVENTION

The invention provides a self-steering caster having the desirable properties described above, by biasing the caster into the steering position with a steady bias force independent of the position of the caster. This is accomplished by providing the caster with a cam in the shape of a circle which is concentric with the swivel axis of the caster, and whose radius increases at a linear rate along its circumference in both directions from the point corresponding to the steering position. A preferably rigid bias wheel is arranged to roll on the cam surface and is biased against it by an appropriate biasing device such as a spring. The biasing force exerted by the bias wheel against the cam surface tries to swivel the caster into the steering position whenever it is allowed to do so.

To prevent flutter and assure accurate steering, a depression of a radius generally equal to that of the bias wheel may be formed on the cam surface, at the point corresponding to the steering position, to act as a detent for releasably locking the caster in the steering position.

BRIEF DESCRIPTION OF THE DRAWINGS

FIG. 1 is a perspective view of the caster of this invention;

FIG. 2 is a vertical section along line 2—2 of FIG. 1;

FIG. 3 is a vertical section along line 3—3 of FIG. 2;

DESCRIPTION OF THE PREFERRED EMBODIMENT

Figure 4:
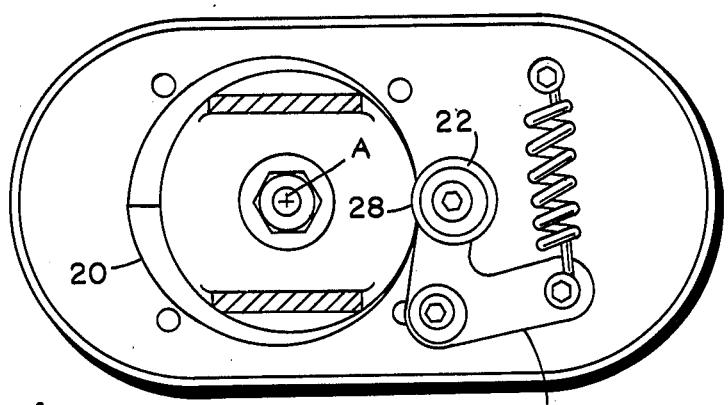
FIG. 4 is a horizontal section along line 4—4 of FIG. 2.

The caster of this invention is generally shown at 10 in FIG. 1. The structure of the caster 10 is in large measure conventional in that it includes a base plate 12 suitable for mounting to an appropriate vehicle, a swivel bearing 14 (which, for the caster of this invention, is preferably a precision-ground bearing because of the need to closely maintain the bearing alignment for the proper functioning of the information), a swivelable wheel bracket 16, and a conventional caster wheel 18. The added elements, in accordance with the invention, are a cam surface 20 on the cylindrical shank of the wheel bracket 16, and a bias wheel 22 supported by a pivoted link 24. The link 24 is biased by a spring 26 into a position where the bias wheel 22 engages the cam surface 20. When the caster is properly aligned in the predetermined steering position, the bias wheel 22 engages the arcuate depression or detent 28 (FIG. 4) which is formed in the cam surface 20 and which has a radius preferably identical to, or at least no greater than, the radius of bias wheel 22. All the parts of the steering mechanism, including the bias wheel 22, are preferably made of a non-resilient material such as metal.

Figure 6:
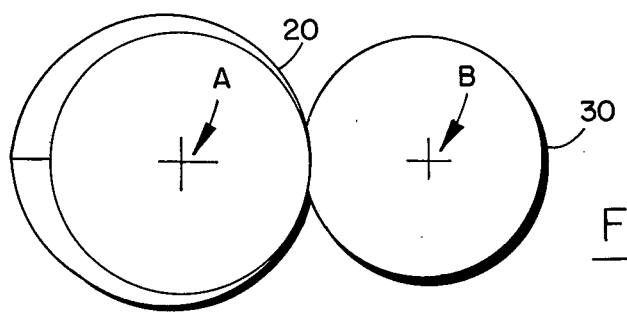
FIG. 6 is a schematic view in the direction of line 6—6 of FIG. 5, of the cam surface and bias wheel of the alternative embodiment of FIG. 5.
Figure 7:
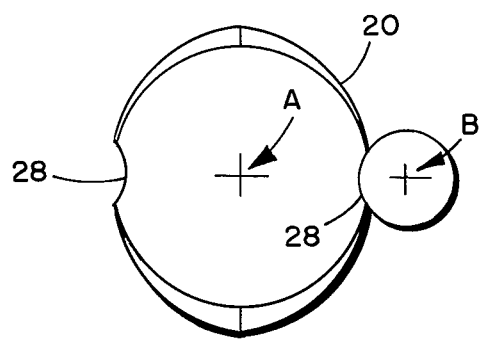
FIG. 7 is a similar schematic view of another alternative embodiment of the invention.

As best shown in FIGS. 4, 6 and 7, the cam surface is not a circle eccentric to the swivel axis A of the wheel bracket 16, but rather a circle concentric with that axis whose radius increases at a linear rate from the center of detent 28 toward a point 180° opposite the detent 28. In the preferred embodiment the increase in radius is on the order of 0.05 mm per degree on a cam on the order of 10 cm in diameter.

This cam shape, which essentially amounts to laying a pair of linear wedges along the circumference of a circle, has the advantage of providing a constant steering force at any point along the cam and of avoiding the dead spot which would occur in practice at the point most remote from the detent 28 if an eccentric circle were used.

The rate of radius increase per degree of arc on the cam surface 20 is dictated to some degree by the average radius of the same surface; in other words, the larger the cam, the greater the rise per degree can be. The specific range of allowable rise rates for a given caster is limited at the upper end by an increase in the steering force to the point where the caster unduly resists handling of the vehicle with the casters out of the steering position; and on the lower end, by the steering force dropping to the point where the casters do not return to the steering position sufficiently fast when approximately straight-line motion is imparted to the vehicle.

The detent depression 18, as previously mentioned, has a radius preferably equal to (or at least not significantly greater than) the radius of bias wheel 22 in order to hold the caster precisely aligned in the steering position and to prevent it from fluttering. The force with which the detent 28 opposes movement of the caster out of the steering position depends, of course, on the radius of the bias wheel 22 and on the force applied by spring 26 through the link 24. In the preferred embodiment described herein, the diameter of the bias wheel 22 is on the order of 5 cm; the legs of link 24 are equal in length; and spring 26 is a 35 kg tension spring. It will be understood that these parameters can be modified to suit particular applications, and that the use of a compression spring in lieu of the tension spring 26 is also possible.

Figure 5:
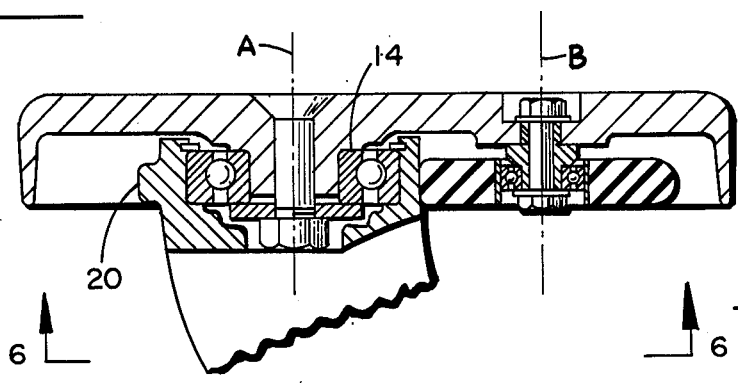
FIG. 5 is a vertical section similar to FIG. 2 but showing the invention.

For certain low-cost applications, it would be possible to replace the bias wheel 22, link 24, and spring 26 with a resilient wheel 30 mounted for rotation on axis B (FIGS. 5 and 6). That embodiment, however, is less satisfactory because the resilient surface of wheel 30 is more prone to allow fluttering and does tend to create a dead spot at the point most remote from detent 28 because at that point, the resilient surface is sufficiently deformed to contact the cam surface 20 throughout an arc of 20°–30° rather than at a single point as does the non-resilient bias wheel 22.

In some applications such as, for example, in grocery trucks, it may be desirable to provide two diametrically opposite steering positions for the casters. In that case, illustrated in FIG. 7, two detent depressions 28 are provided, and there are two points of maximum cam surface radius located on each side of the cam at the points most remote from the detents 28. It will be understood that this concept can also be adapted to situations where more than two steering positions are needed, or where the desired steering positions are not diametrically opposite to each other.

It will be understood that although the invention has been described in terms of the cam surface being on the wheel bracket and the bias wheel assembly being on the mounting bracket, a reversal of these elements would not affect the functioning of the invention.

In accordance with a further aspect of the invention relating specifically to applications such as those described herein above in which the cart is subjected to frequent waterflood sterilization, a depending skirt 32 is provided around the perimeter of the base plate 12 so as to keep the biasing mechanism and the swivel bearing relatively dry when the cart is flooded with water from above and from the sides.

I claim:

1. A self-steering caster, comprising:
   (a) mounting bracket means;
   (b) a wheel assembly including wheel means and wheel bracket means rotatably carrying said wheel means, said wheel assembly being mounted on said mounting bracket means for swiveling movement with respect thereto about a swivel axis; and
   (c) steering means operatively interposed between said mounting bracket means and said wheel assembly so as to bias said wheel assembly into at least one predetermined position with respect to said mounting bracket means, said steering means including:
   (i) cam surface means generally in the shape of a circle coaxial with said swivel axis whose radius increases at a generally linear rate from at least one first point on said cam surface in both directions to at least one second point on said cam surface remote from said first point; and
   (ii) bias wheel means rollingly engaging said cam surface means, the surface of said bias wheel means being biased against said cam surface means;
   (d) said cam surface means being associated with one of said mounting bracket and wheel assembly, and said bias wheel means being associated with the other.

2. The caster of claim 1, in which said cam surface has a depression formed therein at the point of minimum radius, said depression being adapted to cooperate with said bias wheel means to releasably lock said wheel assembly into said predetermined position.

3. The caster of claim 2, in which said depression is generally in the shape of an arc of a circle and has a radius not substantially exceeding the radius of said bias wheel.

4. The caster of claim 1, in which said cam surface has only one of said first points, and only one of said second points diametrically opposite thereto.

5. The caster of claim 1, in which said cam surface has a plurality of said first points and an equal plurality of said second points, said first points alternating with said second points along said cam surface.

6. The caster of claim 1, in which the rolling surface of said bias wheel is nonresilient.

7. The caster of claim 6, in which said bias wheel is biased against said cam surface by spring means.

8. The caster of claim 1, in which said mounting bracket means include depending protective skirt means surrounding said steering means.

* * * * *